United States Patent
Bertsch

(10) Patent No.: US 11,680,512 B2
(45) Date of Patent: Jun. 20, 2023

(54) METHOD FOR OPERATING AN INTERNAL COMBUSTION ENGINE OF A MOTOR VEHICLE, IN PARTICULAR A MOTOR CAR

(71) Applicant: Mercedes-Benz Group AG, Stuttgart (DE)

(72) Inventor: Dietmar Bertsch, Aspach (DE)

(73) Assignee: Mercedes-Benz Group AG, Stuttgart (DE)

(*) Notice: Subject to any disclaimer, the term of this patent is extended or adjusted under 35 U.S.C. 154(b) by 0 days.

(21) Appl. No.: 17/794,419

(22) PCT Filed: Dec. 9, 2020

(86) PCT No.: PCT/EP2020/085245
§ 371 (c)(1),
(2) Date: Jul. 21, 2022

(87) PCT Pub. No.: WO2021/148190
PCT Pub. Date: Jul. 29, 2021

(65) Prior Publication Data
US 2023/0073185 A1   Mar. 9, 2023

(30) Foreign Application Priority Data
Jan. 22, 2020   (DE) ............... 10 2020 000 353.2

(51) Int. Cl.
*F02B 19/12*   (2006.01)
*F02D 41/00*   (2006.01)
(Continued)

(52) U.S. Cl.
CPC ........ *F02B 19/12* (2013.01); *F02D 41/0035* (2013.01); *F02P 5/045* (2013.01);
(Continued)

(58) Field of Classification Search
CPC ............... F02B 19/12; F02D 41/0035; F02D 2041/389; F02P 5/045; F02P 5/1518; F02P 13/00
(Continued)

(56) References Cited

FOREIGN PATENT DOCUMENTS

| DE | 199 52 829 A1 | 5/2001 |
|---|---|---|
| DE | 10 2017 125 946 A1 | 5/2018 |

(Continued)

OTHER PUBLICATIONS

PCT/EP2020/085245, International Search Report dated Mar. 12, 2021 (Two (2) pages).
(Continued)

*Primary Examiner* — Hai H Huynh
(74) *Attorney, Agent, or Firm* — Crowell & Moring LLP

(57) ABSTRACT

A method for operating an internal combustion engine of a motor vehicle, where the internal combustion engine includes a combustion chamber and a prechamber spark plug which is assigned to the combustion chamber and which has a prechamber which is fluidically connected to the combustion chamber via a plurality of openings. The method includes operating the internal combustion engine in a catalytic converter heating operation in which an ignition time, at which an ignition spark for igniting a fuel-air mixture in the combustion chamber is generated in the prechamber within a particular operating cycle of the internal combustion engine, is shifted later compared to a normal operation. An injection time, at which a last direct fuel injection into the combustion chamber is carried out within the particular operating cycle, is a same in the catalytic converter heating operation and in the normal operation.

5 Claims, 1 Drawing Sheet

(51) Int. Cl.
  *F02P 5/15* (2006.01)
  *F02P 5/04* (2006.01)
  *F02P 13/00* (2006.01)
  *F02D 41/38* (2006.01)

(52) U.S. Cl.
  CPC ............. *F02P 5/1518* (2013.01); *F02P 13/00* (2013.01); *F02D 2041/389* (2013.01)

(58) Field of Classification Search
  USPC ........ 123/260, 297, 298, 299, 300, 305, 685
  See application file for complete search history.

(56) References Cited

FOREIGN PATENT DOCUMENTS

| | | |
|---|---|---|
| DE | 10 2018 000 706 A1 | 8/2019 |
| DE | 10 2018 209 096 A1 | 12/2019 |
| WO | WO 2005/100767 A1 | 10/2005 |

OTHER PUBLICATIONS

German Search Report issued in German application No. 10 2020 000 353.2 dated Sep. 14, 2020, with Statement of Relevancy (Nine (9) pages).

German-language German Office Action issued in German application No. 10 2020 000 353.2 dated Mar. 17, 2022 (Five (5) pages).

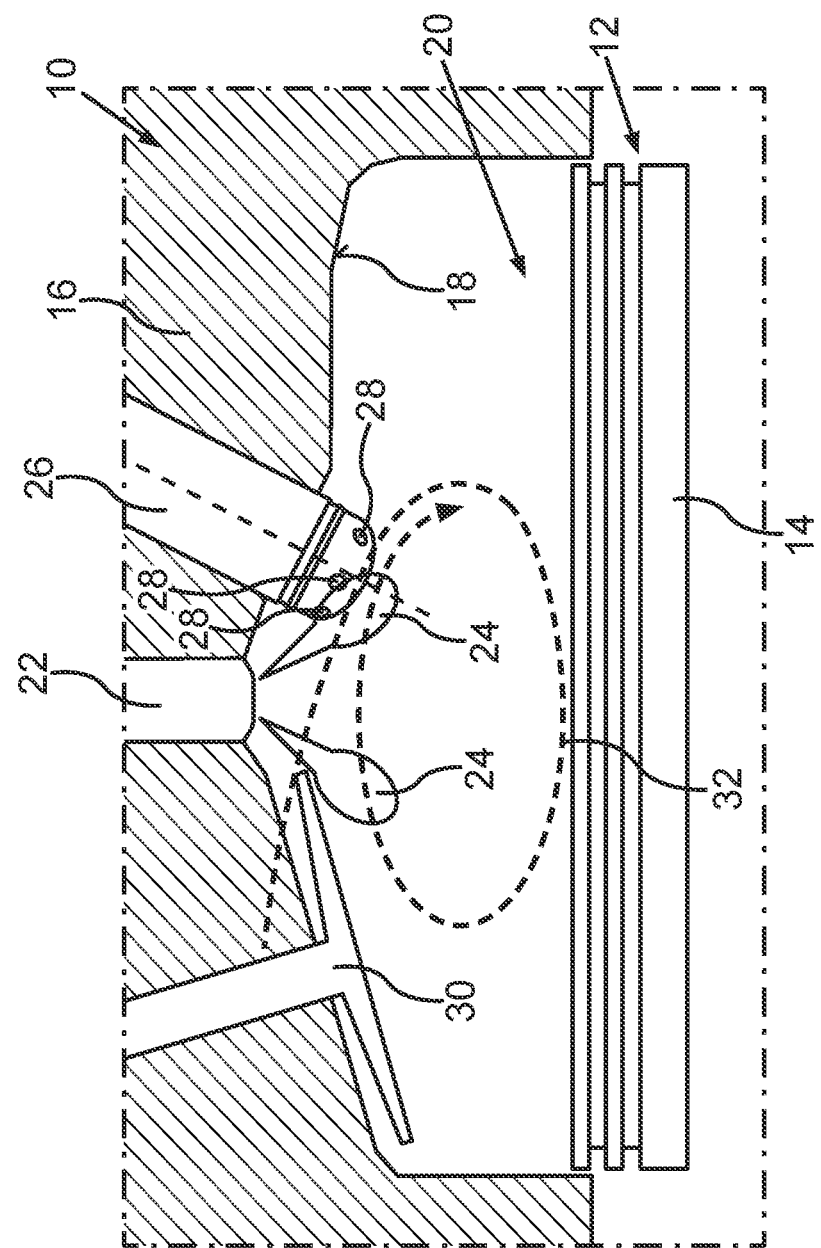

METHOD FOR OPERATING AN INTERNAL COMBUSTION ENGINE OF A MOTOR VEHICLE, IN PARTICULAR A MOTOR CAR

BACKGROUND AND SUMMARY OF THE INVENTION

The invention relates to a method for operating an internal combustion engine of a motor vehicle, in particular a motor car.

Such a method for operating an internal combustion engine of a motor vehicle, in particular a motor car, is already known, for example, from DE 10 2018 000 706 A1. In the method, the internal combustion engine has at least one combustion chamber and a prechamber spark plug which is assigned to the combustion chamber and comprises a prechamber which is fluidically connected to the combustion chamber via a plurality of openings. Furthermore, DE 10 2018 209 096 A1 discloses an injector for injecting fuel. DE 199 52 829 A1 discloses a control system for a multi-cylinder internal combustion engine with a catalytic converter. Furthermore, DE 10 2017 125 946 A1 discloses a system comprising a combustion chamber formed by a cylinder closed by a cylinder head.

It is the object of the present invention to further develop a method of the kind mentioned above in such a way that a particularly advantageous operation can be realized.

In order to further develop a method of the kind described herein in such a way that a particularly advantageous operation of the internal combustion engine can be realized, it is provided in accordance with the invention that the internal combustion engine, which is in the form of a petrol engine, is operated in a catalytic converter heating operation, in which an ignition time, at which an ignition spark for igniting a fuel-air mixture is generated in the prechamber and in the combustion chamber within a particular operating cycle of the internal combustion engine at an ignition time, is shifted later with respect to normal operation. However, an injection time, at which the last direct fuel injection into the combustion chamber is performed within the particular operating cycle, is the same in the catalytic converter operation and in the normal operation. Thus, while the ignition time is shifted later compared to the normal operation to switch from the normal operation to the catalytic converter heating operation or to set the catalytic converter heating operation, which is also referred to as cat heating operation or cat heating, there is no shifting of the injection time to switch to the catalytic converter heating operation or to set the catalytic converter heating operation.

In order to further develop a method of the kind described herein in such a way that a particularly advantageous operation of the internal combustion engine can be realized, it is provided in accordance with the invention that the internal combustion engine in the form of a spark-ignition engine is operated in a catalytic converter heating operation, in which an ignition time, at which an ignition spark for igniting a fuel-air mixture in the prechamber is generated in the prechamber and in the combustion chamber within a particular operating cycle of the internal combustion engine, and an injection time, at which the last direct fuel injection into the combustion chamber is carried out within the particular operating cycle, are shifted later in comparison to normal operation, wherein in the catalytic converter operation within the particular operating cycle there is a crank angle greater than 80° between the injection time and the ignition time, wherein it is preferably provided that in the catalytic converter heating operation a distance lying between the ignition time and the injection time and relating to crank angle is smaller or greater as compared to normal operation within the particular operating cycle.

The invention is based in particular on the following findings: The use of a prechamber spark plug in a spark-ignition direct-injection combustion process should ensure that the function of the catalytic converter heating operation after a cold start is also ensured with this ignition technology in order to achieve exhaust gas limit values or to realize a particularly low-emission operation. In the case of standard spark plugs, a so-called ignition injection is used to inject fuel directly before the ignition time at a constant distance from the ignition in order to stabilize the necessary, very late ignition. In accordance with the invention, a special injection strategy now solves the problem that, in contrast to a standard spark plug, an ignition injection in a prechamber spark plug cannot be discharged directly into the spark area. The aforementioned direct fuel injection means in particular that fuel, especially liquid fuel, is injected directly into the combustion chamber by means of an injector.

In order to reliably bring a combustible mixture into the prechamber of the prechamber spark plug in a catalytic converter heating operation, for example, care should be taken to ensure that the last, and often also the second, injection before ignition takes place in good time so that the injected fuel has sufficient time to pass through the openings of the prechamber spark plug, which are formed as overflow holes, for example, into the prechamber and into the spark area in order to ensure a very good ignitable mixture there. In accordance with the invention, care is taken, for example, to ensure that a constant ignition time or start of injection relative to the crank angle position is selected for this purpose, or that there is a sufficiently large difference in time between the last injection and the ignition time. In particular, the following advantages can be realized by the invention:

better prepared fuel-air mixture is present in the spark area of the prechamber at the ignition time; this improves the ignition conditions, the combustion is stabilized;

no combustion misfires that could lead to damage of the catalytic converter; and higher temperature can be generated in the exhaust gas, since stable combustion can still take place up to the extremely late ignition time, in order to deteriorate the thermodynamics through the late combustion positions in such a way that the catalytic converter is heated up to its working range (temperature window) as quickly as possible.

Further findings underlying the invention, on the other hand, are that with the introduction of piezo injectors for direct fuel injection, the possibility has been created and utilized of discharging, that is to say performing, a number of injections within a particular operating cycle. For example, up to eight injections are performed at low engine speeds in order to avoid excessive particle emissions, for example. Especially for the operating mode of catalytic converter heating, it is possible to work with an ignition injection that is usually coupled to the ignition time and always has the same distance from the ignition time. This distance is, for example, a crank angle of 10°. By means of the ignition injection, a very small amount of fuel, also referred to as a minimal amount, is discharged in the direction of the spark plug in order to produce a sufficiently rich fuel cloud in the spark area of the spark plug, which is formed as a standard spark plug, at the ignition time, which in turn leads to stable ignition. In catalytic converter heating operation with its very late center of gravity positions, the engine running smoothness was and is rather unfavorable, wherein the method according to the invention can now ensure an advantageous running smoothness of the internal combustion engine also during catalytic converter heating operation. Through the use of the prechamber spark plug, ignition-coupled injection can no longer be implemented as with standard spark plugs, since the fuel cannot enter the spark area directly, but only in a roundabout way, more specifically via the openings into the spark area or to a spark gap. Measurements on a single-cylinder unit have shown that it is now no longer necessary or expedient to discharge the ignition injection very shortly before the ignition time. Similarly, it is no longer better to couple the last injection to the ignition time or to shift it when the ignition time is shifted. Experiments have shown that the flow structure in the prechamber is maintained very well and for a very long time, so that it is possible to define the advantageous injection time for the last injection in catalytic converter heating operation at a fixed time in order to realize a particularly advantageous smooth running of the internal combustion engine.

Further advantages, features and details of the invention will become apparent from the following description of a preferred exemplary embodiment and from the drawing. The features and combinations of features mentioned above in the description as well as the features and combinations of features mentioned below in the FIGURE description and/or shown alone in the single FIGURE can be used not only in the combination indicated in each case, but also in other combinations or on their own, without departing from the scope of the invention.

BRIEF DESCRIPTION OF THE DRAWING

The drawing shows, in the single FIGURE, a schematic sectional view of an internal combustion engine of a motor vehicle, wherein the internal combustion engine is operated in accordance with a method according to the invention.

DETAILED DESCRIPTION OF THE DRAWING

The single FIGURE shows a schematic sectional view of a detail of an internal combustion engine 10, in the form of a reciprocating piston engine, of a motor vehicle, in particular a motor car. This means that the motor vehicle in its fully manufactured state comprises the internal combustion engine 10 and can be driven by means of the internal combustion engine 10. The internal combustion engine 10 has a housing element which is not shown in the FIGURE and which is formed, for example, as a crankcase, in particular as a cylinder crankcase, by means of which at least one cylinder 12 is formed or delimited. Here, the internal combustion engine 10 comprises at least one piston 14, which is arranged so as to be movable in translation in the cylinder 12 and consequently so as to be movable between a bottom dead center and a top dead center. The internal combustion engine 10 additionally comprises a second housing element 16, which is for example formed separately from the first housing element and is connected to the first housing element. The housing element 16 is, for example, a cylinder head, by which a combustion chamber roof 18 is formed. The cylinder 12, the piston 14 and the combustion chamber roof 18 each form or partially delimit a combustion chamber 20 of the internal combustion engine 10 formed as a reciprocating engine. The combustion chamber 20 is assigned an injector 22, by means of which a fuel, in particular liquid fuel, can be injected directly into the combustion chamber 20, resulting in the formation of various fuel jets 24, for example in the form of cones or club-shaped streams. Direct injection of the fuel in the combustion chamber 20 is also referred to as direct injection or direct fuel injection. The internal combustion engine 10 is formed as a spark-ignition engine and additionally comprises a prechamber spark plug 26, which is assigned to the combustion chamber 20 and which has a prechamber, not further identifiable in the FIGURE. The prechamber of the prechamber spark plug 26 is fluidically connected to the combustion chamber 20 via various openings 28, for example in the form of bores, and is otherwise preferably separated from the combustion chamber 20. In the prechamber there is arranged an electrode arrangement, by means of which at least one ignition spark can be generated in particular in a spark area arranged in the prechamber, the spark area also being referred to as a spark gap.

At least during a fired operation of the internal combustion engine 10, the aforementioned fuel and air are introduced into the combustion chamber 20 within a particular operating cycle of the internal combustion engine 10, whereby a fuel-air mixture, also referred to as charge or mixture, is formed in the combustion chamber 20. At least a portion of the fuel-air mixture can flow from the combustion chamber 20 into the prechamber via the openings 28. If the ignition spark is then generated in the prechamber, for example, in particular at an ignition time, the portion of the fuel-air mixture received in the prechamber and the remaining fuel-air mixture in the combustion chamber 20 are thereby ignited and subsequently combusted.

In addition, a gas exchange valve 30 of the internal combustion engine 10, assigned to the combustion chamber 20 and formed, for example, as an inlet valve, can be seen in the FIGURE For example, the aforementioned air can flow into the combustion chamber 20 via the inlet valve, in particular so as to form a tumbling flow, illustrated in the FIGURE by an arrow 32, resulting in a tumbling charge movement into the combustion chamber 20, for example.

In order to realize a particularly advantageous operation of the internal combustion engine 10, the internal combustion engine 10 is operated in accordance with a method which is explained hereinafter. In the method, the internal combustion engine 10 in the form of a spark-ignition engine is operated in a catalytic converter heating operation, which is provided or carried out in a targeted manner in order to heat at least one catalytic converter through which exhaust gas from the internal combustion engine 10 can flow. In the catalytic converter heating operation, the ignition time, at which the ignition spark for igniting the fuel-air mixture in the prechamber and in the combustion chamber 20 is generated within the particular operating cycle of the internal combustion engine 10 in the prechamber, is shifted later in relation to a normal operation of the internal combustion engine 10 following, for example, the catalytic converter heating operation, wherein an injection time at which the last direct fuel injection into the combustion chamber 20 is carried out by means of the injector 22 within the particular operating cycle is the same in the catalytic converter heating operation and in the normal operation. Alternatively, it is conceivable that the ignition time and the injection time in the catalytic converter heating operation are shifted later compared to the normal operation, wherein, in the catalytic converter heating operation, there is then a crank angle of greater than 80° between the injection time and the ignition time within the particular operating cycle.

In the catalytic converter heating operation, also referred to as cat heating operation, the thermodynamics of the combustion are intentionally worsened, in particular after a cold start of the internal combustion engine 10, in order to increase the exhaust gas temperature and thereby shorten the heating time up to the working temperature of the catalytic converter, also referred to as the light-off temperature of the catalytic converter. Usually, the ignition time is shifted later for this purpose, and combustion takes place at a thermodynamically unfavorable later point in time. Such a late ignition of the mixture usually results in an undesirable, increased cycle fluctuation or running irregularity, which in extreme cases can lead to combustion misfires. In order to improve the ignition conditions even with these late ignition times, when using a standard spark plug, in particular with a front electrode, a multiple injection is applied, with the last injection of this usually being coupled to the ignition time and injecting a small amount of fuel into the spark area of the spark plug at a constant distance from this ignition time equaling approximately a 10° crank angle to a 20° crank angle, where it ensures good and stable ignition as a rich mixture cloud.

When using a, or the, prechamber spark plug, however, this mixture cloud cannot reach the spark area directly, but in the case of the prechamber spark plug 26 the mixture cloud is diverted through the openings 28, which are formed for example as overflow holes, and a deflection in the inlet into the prechamber and in the prechamber into the spark area located there. This requires a longer time, depending on the free path length from the injector 22, also known as the injection valve, to the spark gap in the prechamber, the speed, and the injection pressure. Accordingly, an ignition-coupled last injection with a greater distance from a 20° crank angle to a 100° crank angle or from a 30° crank angle to a 60° crank angle to a 60° crank angle is preferably provided for the cat heating operation with the prechamber spark plug 26. Likewise, it may be advantageous not to apply this last injection in an ignition-coupled manner, but rather to discharge it at a constant point in time, even though ignition may take place at different points in time. This is related to the flow conditions in the prechamber. Such a constant injection time for the last injection for the cat heating operation with a prechamber spark plug is advantageously at a 100° crank angle before the top ignition dead center to a 10° crank angle before the top ignition dead center or from a 70° crank angle before the top ignition dead center to a 30° crank angle before the top ignition dead center of the piston 14.

The invention claimed is:

1. A method for operating an internal combustion engine of a motor vehicle, wherein the internal combustion engine comprises a combustion chamber and a prechamber spark plug which is assigned to the combustion chamber and which has a prechamber which is fluidically connected to the combustion chamber via a plurality of openings, the method comprising:
operating the internal combustion engine, wherein the internal combustion engine is a spark-ignition engine, in a catalytic converter heating operation in which:
an ignition time, at which an ignition spark for igniting a fuel-air mixture in the combustion chamber is generated in the prechamber within a particular operating cycle of the internal combustion engine, is shifted later compared to a normal operation; and
an injection time, at which a last direct fuel injection into the combustion chamber is carried out within the particular operating cycle, is a same in the catalytic converter heating operation and in the normal operation.

2. The method according to claim 1, wherein within the particular operating cycle, the injection time is 100 crank angle degrees before a top ignition dead center of a piston partially delimiting the combustion chamber up to 10 crank angle degrees before the top ignition dead center.

3. The method according to claim 2, wherein within the particular operating cycle, the injection time is 70 crank angle degrees before the top ignition dead center up to 30 crank angle degrees before the top ignition dead center.

4. A method for operating an internal combustion engine of a motor vehicle, wherein the internal combustion engine comprises a combustion chamber and a prechamber spark plug which is assigned to the combustion chamber and which has a prechamber which is fluidically connected to the combustion chamber via a plurality of openings, the method comprising:
operating the internal combustion engine, wherein the internal combustion engine is a spark-ignition engine, in a catalytic converter heating operation, in which:
an ignition time, at which an ignition spark for igniting a fuel-air mixture in the combustion chamber is generated in the prechamber within a particular operating cycle of the internal combustion engine, and an injection time, at which a last direct fuel injection into the combustion chamber is carried out within the particular operating cycle, are shifted later compared to a normal operation;
wherein in the catalytic converter heating operation there are more than 80 crank angle degrees between the injection time and the ignition time within the particular operating cycle.

5. The method according to claim 4, wherein in the catalytic converter heating operation there are more than 90 crank angle degrees between the injection time and ignition time within the particular operating cycle.

* * * * *